J. H. MILLER.
THRESHING MACHINE.

No. 111,367. Patented Jan. 31, 1871.

Inventor.
Joseph H. Miller
by his Att'ys.
Cox & Cox

Witnesses:

J. H. MILLER.
THRESHING MACHINE.

No. 111,367.  Patented Jan. 31, 1871.

Witnesses:
N. C. Chinney
E. W. Walter

Inventor:
Joseph H. Miller
by his Att'ys.
Cox & Cox

3 Sheets—Sheet 3.
J. H. MILLER.
THRESHING MACHINE.
No. 111,367.  Patented Jan. 31, 1871
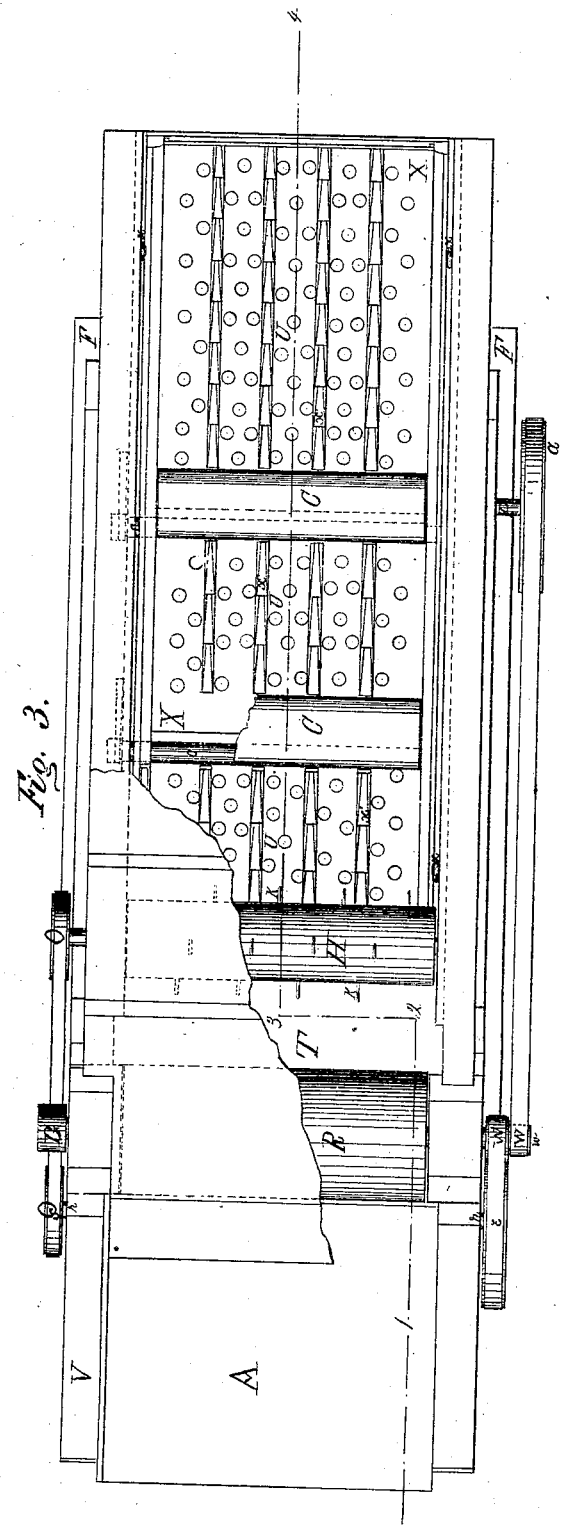
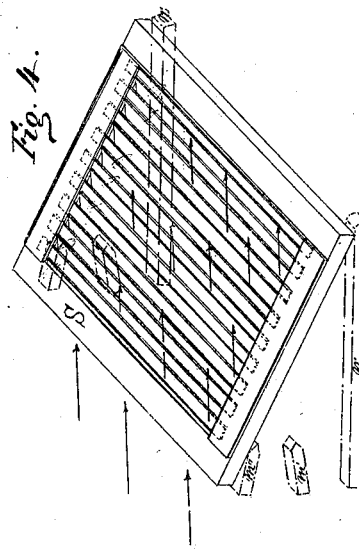
Inventor
Joseph H. Miller
by his Att'ys
Fox & Cox
Witnesses:
N. C. Kinney
R. W. Walter

United States Patent Office.

JOSEPH H. MILLER, OF ARCADIA, NORTH CAROLINA.

Letters Patent No. 111,367, dated January 31, 1871; antedated January 23, 1871.

IMPROVEMENT IN THRASHING-MACHINES.

The Schedule referred to in these Letters Patent and making part of the same.

*To all whom it may concern:*

Be it known that I, JOSEPH H. MILLER, of Arcadia, in the county of Davidson and State of North Carolina, have invented a new and useful Improvement in Thrashing and Cleaning-Machines, of which the following is a specification, reference being had to the accompanying drawing.

Nature and Objects of the Invention.

The invention relates to that class of thrashing and cleaning-machines which receives the stalks from the feed-table, whence they are drawn under and the heads of grain compressed by a feed-roller, which forces the material forward until it is caught by the curved teeth of a cylinder-rake, and by it delivered upon an oscillating perforated shaker, provided with teeth, which carry the straw to the other end of the shaker, where it falls to the ground, the grain being at the same time shaken or thrashed from the straw by beaters operated by a pitman-shaft; the grain passes through the cover of the shaker into the compartment below, when it is delivered on an inclined lattice-sieve, through the apertures of which a strong current of air is forced by the fan-blower, and in its passage over this sieve the grain is thoroughly cleaned. The sieve is placed in a plane which has an oscillating motion derived from pitmen-cranks on the fan-blower shaft.

The objects of the invention are to prevent the straw choking or clogging the feed-roller; to thoroughly separate the grain from straw, chaff, and other matter, and to separate the kernels of grain from each other.

The invention is intended to be used in thrashing and cleaning wheat, oats, rye, and other small grain cereals.

Description of the Accompanying Drawing.

Figure 3 is a plan view of the top of the invention, the cover removed.

Figure 4 is a perspective view of the sieve S.

Figure 5 is a vertical section of a part of the sieve S.

Figure 1:
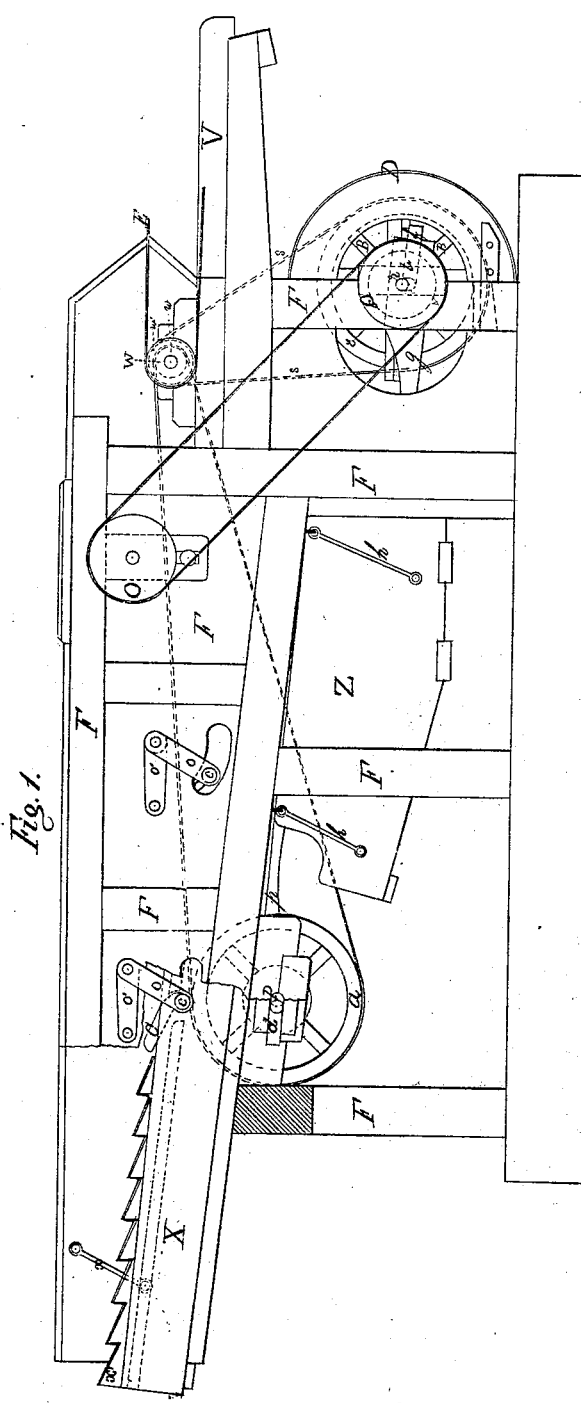
Figure 1 is a side elevation of the left side of the invention with a portion of the forward part of the frame F broken out.
Figure 2:
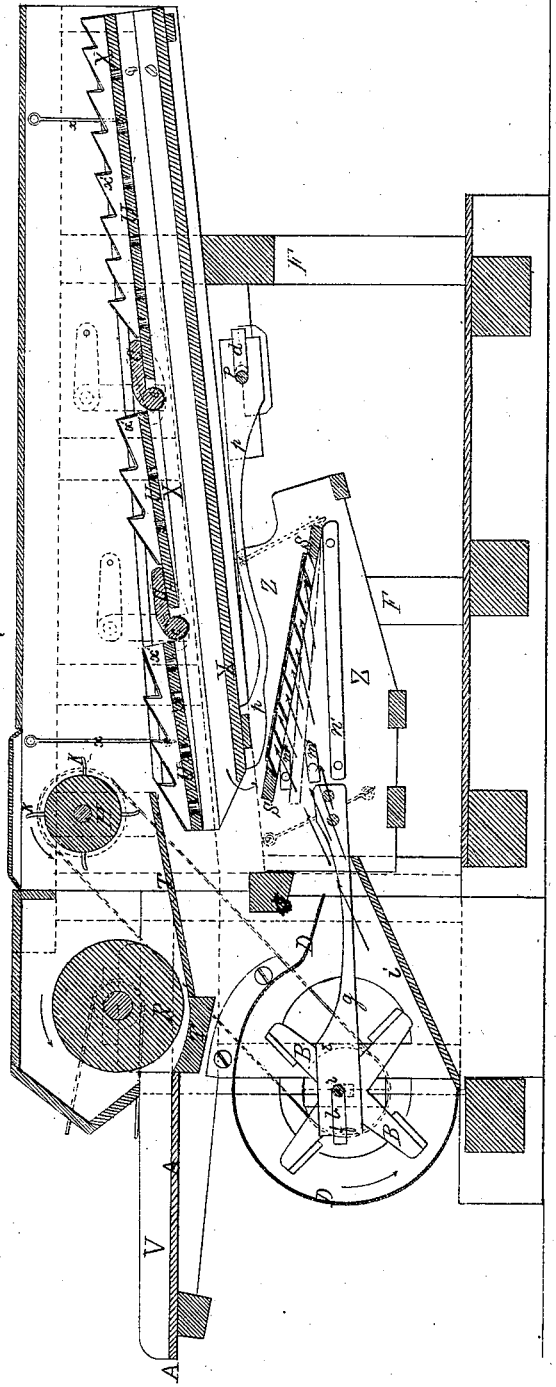
Figure 2 is a vertical section through the line 1 2 3 4, as shown in fig. 3.

General Description.

F, in the accompanying drawing, is the frame which supports and incloses the machine, except above, where it is covered by an appropriately-shaped adjustable lid, and as to the fan-blower B, which is inclosed in the fan-drum D.

A is the feeding-floor, immediately above the far drum D, and in rear of the back part of the uppe part of the frame F, and is provided on the left sid with a vertical flange, V.

Immediately in front of and adjoining the feed-floor A is the thrashing-floor T, the rear portion of which is concave, and in close relation to the feed-roller R above it. The front part of the floor T inclines upward and forward.

R is the feed-roller, provided on each side with an axle working in boxes on each side of the frame F, motion being communicated to the roller R by a band, E, passing over a wheel, G, on the extremity of its left axle, which extends a proper distance beyond the side of the frame F. The motion of the roller R is from front to rear.

The other axle is provided with a double bandwheel, W, near its extremity, the inner one being of greater diameter than the outer, and both operating bands, the former communicating motion to the fan-blower B, the latter to the shaker X.

At a proper distance above the front edge of the thrashing-floor T is placed a cylinder rake, H, provided with teeth K, curved in the direction of the movement of the cylinder, and of sufficient length to catch the stalks and draw them under the cylinder without coming in contact with the thrashing-floor T.

The cylinder rake H is provided with an axle on each side, which works in journals one on each side of and near the end of the upper part of the frame F.

The left journal, extending beyond that side of the frame, is provided with a band-wheel, over which passes a band, O, connected with the band-wheel Q, on the left axle of the fan-blower B, whereby a movement from front to rear is communicated to the rake H.

The shaker X is a rectangular parallelogram compartment, open at each end, closed on each side and below, and on top covered by perforated plates U, and the beaters O. It is placed between the interior sides of the upper part or trough of the frame F, and inclines from front to rear.

The vertical sides of the shaker X are attached by means of swinging-rods x to the inside of the frame F, and inclose on each side the top and bottom of the shaker X, projecting slightly above the former, to prevent the grain escaping at the sides.

The top of the shaker X consists of a proper number of perforated sections, U, provided on their upper surface, except where the beaters O touch the same, with teeth x', the fronts of which project upward and forward, being placed in rows parallel to the sides of the shaker and properly separated from each other, the respective teeth being in the same vertical plane. These sections U of the top are separated from each other by the shafts of the beaters C, a space being left between the rear of each section U and the front of the beater-shaft c.

The front edge of each perforated section U is elevated higher than its own rear edge, and above that part of the section immediately in front of it. The inclination of the shaker X is thus downward from front to rear, the extremity of the latter part being under and slightly separated from the front of the thrashing-floor T.

Motion is communicated to the shaker X by means of a band-wheel, a, on the right side of the frame F, which is turned by a band connecting it with the smaller band-wheel w on the right axle of the feed-roller R.

The band-wheel a is rigidly secured to the right extremity of the shaft P, the axles of which work in boxes on each side of the frame F, and is provided on each side inside of the frame with a pitman crank, d, to the horizontal bar of which are secured in journals the front extremities of the spring shafts p, rear ends of which are secured to the under side of the shaker X, the pressure of which spring shafts is equal and upward, assisting in the revolution of the shaft P. This gives the shaker an oscillating reciprocal movement in the direction of its length when the band-wheel a is revolved.

The rear edge of the beater C is rigidly secured to a shaft, c, the right axle of which works in a journal in the side of the shaker X.

The left axle passes through the opposite side and through the frame F, its extremity being firmly secured at right angles to the end of an arm, o, the opposite end of which is attached by a pivot either to the side of frame F or to the end of a second arm, o', firmly affixed to the frame. From the latter arm o' the former depends at right angles.

An aperture of proper size and shape is made in the side of the frame F to allow the left axle of the shaft c a movement similar to that of the shaker X, which causes the beater C to rise and fall as the shaker moves forward or backward.

The fan-blower is situated below the feed-floor A, and is inclosed on three sides by a fan-drum, D. On the remaining side, being that part below the lower front quarter of the blower B, is provided a wind-board, i, so inclined that an aperture is left between its upper front edge and the upper front edge of the fan-drum, through which the draught created by the blower B passes.

This blower is operated by a shaft, r, the extremities of which are provided with axles working in boxes b on the sides of the braces of the frame F, the right axle being furnished with a band-wheel, t, rigidly attached, and a band, s, connecting with the inner band-wheel w' on the extremity of the right axle of the feed-roller R, by means of which motion in the same direction as that of the feed-roller is communicated to the blower shaft r, and through it to the band-wheel on the left axle, and thence by a band to the cylinder-rake H.

The blower shaft is provided on each side, between the vertical planes of the ends of the drum D and the fan-blower B, with a pitman crank, f, the horizontal bars of which work in journals in the extremities of two shafts g, the other ends of which are rigidly secured to the inside of the opposite vertical sides of the oscillating sieve-frame Z, which is hung on swinging rods h, under the rear portion of the bottom of the shaker X. Thus, by the operation of the blower shaft r, an oscillating reciprocal motion is given to the frame Z.

In construction the sieve-frame Z is open above and below, its sides being vertical, its general outline an oblong parallelogram. Its lower edges are braced by means of bars or slats.

On the inside of the vertical sides, at a proper distance above the lower edges thereof, is a horizontal ledge, n', above the rear ends of which, separated from the ledge n' and each other a proper distance, are rigidly secured two or more wedge-shaped rests m', with their apexes in front.

The purpose of the ledge n' and rests m' m'' is to sustain a sieve, S, in such position that the draught created by the fan-blower B will pass directly through its apertures.

The sieve S fits between the interior of the vertical sides of the sieve-frame Z, and can be removed at will. It consists of a rectangular frame, provided with slats or lattices, the ends of which are mortised into the interior edge of the frame. The slats are formed with two sides, the upper one of which is in the plane of the upper surface of the frame, the other inclining toward the plane of the lower surface of the frame at an angle of about forty-five degrees (45°) to the upper side. These slats occupy the interior of the frame, and are parallel to each other, and so separated that a grain of wheat cannot pass vertically between them when the sieve is in position.

The sieve S is so supported by the ledge n' and the rests m' or m'', that the narrower or upper sides of the lattices are above, the wider or lower inclining downward toward the fan-blower B, so that the current of air therefrom passes between the slats in a direction at or about right angles to their upper surfaces.

Operation of the Invention.

Motion being communicated to the band-wheel G, the same is given to the different parts of the machine, which is then ready to receive the material to be thrashed and cleaned.

For the sake of convenience, the operation of the invention will be illustrated by describing the thrashing and cleaning of wheat.

The sheaf, the wythe or binder being removed, is spread out upon the feed-floor A, with the heads of the grain toward the feed-roller R. It is then pushed forward until it comes in contact with the roller R, which draws the wheat under, and at the same time crushes or compresses the ears between its own surface and the upper surface of the thrashing-floor T. The wheat is thus carried forward until it comes in contact with the teeth of the revolving cylinder-rake H, which assists in loosening the kernels of grain from their husks, at the same time effectually and swiftly clearing the space between the feed-roller R and the thrashing-floor T of the straw. The material which passes under the rake H is thus carried forward until it falls upon the upper surface of the shaker X, the action of which and its construction being such that the material is continually pushed forward until the straw is thrown from the upper and forward extremity of the shaker X.

In the course of its progress the material is vigorously thrashed from below by the action of the beater C, and the grain falls either through the perforated sections U, or the spaces between the beater shafts t and the rear edges of the sections in front into the compartment below, passing, on account of the oscillating movement of the shaker, down the inclined upper surface of its under side, whence the grain falls upon the inclined sieve S through the apertures, in which a vigorous current of air is passing, which cleans the grain of all chaff and lighter material in the course of its descent. The larger grain passing over the apertures in the sieve S is caught in a hopper, placed immediately below its front edge, while the smaller grain passes between the apertures and is received in a properly-constructed receptacle below. The wheat passing between the openings in the sieve may be caught in a properly-constructed trough secured below. The screenings will usually pass through the sieve somewhat lower down its slope than the small wheat. The heavier the grain to be thrashed, the greater should be the incline of the sieve.

Claims.

What I claim as my invention, and desire to secure by Letters Patent, is—

1. The cylinder rake H, in combination with the shaker X, provided with the toothed perforated transverse sections U, beaters O, and under side, constructed and arranged substantially in the manner and for the purpose specified.

2. The shaker X, provided with the toothed perforated sections U, beaters O, and under side, constructed and arranged substantially as shown and set forth.

3. The beater O, provided with the solid flange, constructed and arranged as shown.

4. The combination of the beaters O, arranged and operated as shown and described, with the perforated plates U, provided with the teeth $x'$, substantially as and for the uses and purposes set forth.

5. The arrangement of the smooth feed-roller R, toothed-cylinder rake H, shaker X, provided with the beaters O, the slatted sieve S, and fan-blower B, constructed and operated in the manner and for the uses and purposes substantially as herein shown and described.

In testimony that I claim the foregoing improvements in thrashing and cleaning-machines, as above described, I have hereunto set my hand and seal this 23d day of May, 1870.

JOSEPH H. MILLER. [L. S.]

Witnesses:
 JOHN H. WELBORN,
 T. O. FORD.